United States Patent
Nishida (10) Patent No.: US 11,814,035 B2
(45) Date of Patent: Nov. 14, 2023

(54) VEHICLE RESCUE DEVICE, VEHICLE RESCUE METHOD, AND PROGRAM

(71) Applicant: HONDA MOTOR CO., LTD., Tokyo (JP)

(72) Inventor: Yoshikazu Nishida, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 332 days.

(21) Appl. No.: 17/190,427

(22) Filed: Mar. 3, 2021

(65) Prior Publication Data

US 2021/0284128 A1    Sep. 16, 2021

(30) Foreign Application Priority Data

Mar. 10, 2020   (JP) .................................. 2020-040899

(51) Int. Cl.
| | |
|---|---|
| *B60W 20/20* | (2016.01) |
| *B60W 20/40* | (2016.01) |
| *H02J 7/00* | (2006.01) |
| *H02J 3/32* | (2006.01) |

(52) U.S. Cl.
CPC ............ *B60W 20/20* (2013.01); *B60W 20/40* (2013.01); *H02J 3/322* (2020.01); *H02J 7/0048* (2020.01)

(58) Field of Classification Search
CPC . G01C 21/3438; G01C 21/3469; B60L 53/60; B60L 53/62; B60L 53/63; B60L 53/64; B60L 53/65; B60L 53/66; B60L 53/67; B60L 53/68; H02J 7/0048
See application file for complete search history.

(56) References Cited

U.S. PATENT DOCUMENTS

| | | | |
|---|---|---|---|
| 2012/0109409 A1 | 5/2012 | Hara et al. | |
| 2014/0278104 A1* | 9/2014 | Proietty | G01C 21/3438 701/400 |
| 2015/0197154 A1* | 7/2015 | Jones | B60L 3/0046 709/227 |

(Continued)

FOREIGN PATENT DOCUMENTS

| | | |
|---|---|---|
| CN | 1410294 A | 4/2003 |
| CN | 1716336 A | 1/2006 |

(Continued)

*Primary Examiner* — Russell Frejd
*Assistant Examiner* — Sara J Lewandroski
(74) *Attorney, Agent, or Firm* — CKC & Partners Co., LLC (57) ABSTRACT

A vehicle rescue device includes a communication unit that is communicable with an onboard communication device or a terminal device of a user of each of a plurality of electric vehicles; a receiving unit configured to store, in a storage unit, vehicle notification information received by the communication unit; a determination unit configured to determine, based on the vehicle notification information of an electric vehicle that has requested an electric power supply and the vehicle notification information of an electric vehicle that has accepted a rescue request, whether or not the electric vehicle that has accepted the rescue request can be dispatched to the electric vehicle that has requested the electric power supply; and a management unit configured to direct the electric vehicle that has accepted the rescue request to a location where electric power supply to the electric vehicle that has requested the electric power supply can be performed.

5 Claims, 5 Drawing Sheets

(56) References Cited

U.S. PATENT DOCUMENTS

2019/0126756 A1    5/2019   Yourou et al.
2019/0126757 A1    5/2019   Kagawa et al.
2019/0126768 A1    5/2019   Niwa et al.

FOREIGN PATENT DOCUMENTS

| | | |
|---|---|---|
| CN | 102564426 A | 7/2012 |
| CN | 106204219 A | 12/2016 |
| CN | 109228898 A | 1/2019 |
| CN | 109747455 A | 5/2019 |
| JP | 2012108870 A | 6/2012 |
| JP | 2013115873 A | 6/2013 |
| JP | 2019086840 A | 6/2019 |
| JP | 2019086841 A | 6/2019 |
| JP | 2019088040 A | 6/2019 |

* cited by examiner

151: VEHICLE INFORMATION

| VEHICLE IDENTIFICATION INFORMATION | ADDRESS OF THE ONBOARD COMMUNICATION DEVICE |
|---|---|
| AAAA | XXX |
| BBBB | YYY |
| CCCC | ZZZ |
| ... | ... |

FIG. 4

152: USER INFORMATION

| USER ID | VEHICLE IDENTIFICATION INFORMATION | BATTERY IDENTIFICATION INFORMATION | CONTACT INFORMATION |
|---|---|---|---|
| 0001 | AAAA | DDDD | XXX |
| 0002 | BBBB | EEEE | YYY |
| 0003 | CCCC | FFFF | ZZZ |
| ... | ... | ... | ... |

FIG. 5

153: VEHICLE NOTIFICATION INFORMATION

| VEHICLE IDENTIFICATION INFORMATION | INFORMATION INDICATING CHARGE STATE | BATTERY IDENTIFICATION INFORMATION | VEHICLE POSITION INFORMATION |
|---|---|---|---|
| AAAA | XX | DDDD | (*,*) |
| BBBB | YY | EEEE | (+++,+++) |
| ... | ... | ... | ... |

VEHICLE RESCUE DEVICE, VEHICLE RESCUE METHOD, AND PROGRAM

This application is based on and claims the benefit of priority from Japanese Patent Application 2020-040899, filed on 10 Mar. 2020, the content of which is incorporated herein by reference.

BACKGROUND OF THE INVENTION

Field of the Invention

The present invention relates to a vehicle rescue device, vehicle rescue method, and program.

Related Art

In recent years, electric vehicles such as battery electric vehicles (BEVs) and hybrid electric vehicles (HEVs) equipped with electric motors driven by rechargeable batteries are becoming popular.

When the state of charge (SOC) of the rechargeable battery of an electric vehicle decreases, the electric vehicle may not be able to drive to the nearest charging facility. Therefore, techniques have been proposed in which the states of charge of rechargeable batteries of a plurality of electric vehicles are managed, and an electric vehicle of a user who has agreed to supply electric power is directed to a location of an electric vehicle of a user who requests an electric power supply to supply power (See Patent Documents 1-3).

Patent Document 1: Japanese Unexamined Patent Application, Publication No. 2019-86840
Patent Document 2: Japanese Unexamined Patent Application, Publication No. 2019-86841
Patent Document 3: Japanese Unexamined Patent Application, Publication No. 2019-88040

SUMMARY OF THE INVENTION

When it comes to supplying electric power between electric vehicles, it is possible that if the respective rechargeable batteries are of different types, it may not be possible to appropriately supply electric power from the electric vehicle of the user who has agreed to supply electric power to the electric vehicle of the user who requests an electric power supply.

One object of the present invention is to provide a vehicle rescue device, vehicle rescue method, and program capable of performing supply of electric power between electric vehicles more reliably.

The vehicle rescue device, vehicle rescue method, and program according to the present invention employ the following configurations:

(1): A vehicle rescue device according to an aspect of the present invention is a vehicle rescue device including: a communication unit that is communicable with an onboard communication device or a terminal device of a user of each of a plurality of electric vehicles; a receiving unit configured to store, in a storage unit, vehicle notification information including respective vehicle identification information, position information, identification information of a rechargeable battery, and information indicating a charge state of one or more electric vehicles received by the communication unit; a determination unit configured to determine, based on the vehicle notification information of an electric vehicle that has requested an electric power supply and the vehicle notification information of an electric vehicle that has accepted a rescue request, whether or not the electric vehicle that has accepted the rescue request can be dispatched to the electric vehicle that has requested the electric power supply; and a management unit configured to direct the electric vehicle that has accepted the rescue request to a location where electric power supply to the electric vehicle that has requested the electric power supply can be performed, if the determination unit has determined that the electric vehicle that has accepted the rescue request can be dispatched to the electric vehicle that has requested the electric power supply.

(2): In the aspect described in (1) above, when the communication unit has received an electric power supply request notification from the terminal device of a user, the management unit causes the communication unit to transmit a rescue request notification to another electric vehicle, and to receive a rescue acceptance notification from one or more electric vehicles.

(3): In the aspect described in (1) or (2) above, the information indicating the charge state of the electric vehicle includes a state of charge of a rechargeable battery installed in the electric vehicle.

(4): A vehicle rescue method according to an aspect of the present invention is a vehicle rescue method performed by a vehicle rescue device including a communication unit that is communicable with an onboard communication device or a terminal device of a user, the method comprising: storing, in a storage unit, vehicle notification information including respective vehicle identification information, position information, identification information of a rechargeable battery, and information indicating a charge state of one or more electric vehicles received by the communication unit; determining, based on the vehicle notification information of an electric vehicle that has requested an electric power supply and the vehicle notification information of an electric vehicle that has accepted a rescue request, whether or not the electric vehicle that has accepted the rescue request can be dispatched to the electric vehicle that has requested the electric power supply, and directing the electric vehicle that has accepted the rescue request to a location where electric power supply to the electric vehicle that has requested the electric power supply can be performed, if it has been determined that the electric vehicle that has accepted the rescue request can be dispatched to the electric vehicle that has requested the electric power supply.

(5): A program according to an aspect of the present invention is a program that causes a vehicle rescue device including a communication unit that is communicable with an onboard communication device or a terminal device of a user to perform a method, the method comprising: storing, in a storage unit, vehicle notification information including respective vehicle identification information, position information, identification information of a rechargeable battery, and information indicating a charge state of one or more electric vehicles received by the communication unit; determining, based on the vehicle notification information of an electric vehicle that has requested an electric power supply and the vehicle notification information of an electric vehicle that has accepted a rescue request, whether or not the electric vehicle that has accepted the rescue request can be dispatched to the electric vehicle that has requested the electric power supply; and directing the electric vehicle that has accepted the rescue request to a location where electric power supply to the electric vehicle that has requested the electric power supply can be performed, if it has been determined that the electric vehicle that has accepted the rescue request can be dispatched to the electric vehicle that has requested the electric power supply.

According to the above configurations (1)-(5), electric power supply between electric vehicles can be performed more reliably.

DETAILED DESCRIPTION OF THE INVENTION

An embodiment of the vehicle rescue device, vehicle rescue method, and program according to the present invention is described below.

(Electric Power Supply Management System 1)

Figure 1:
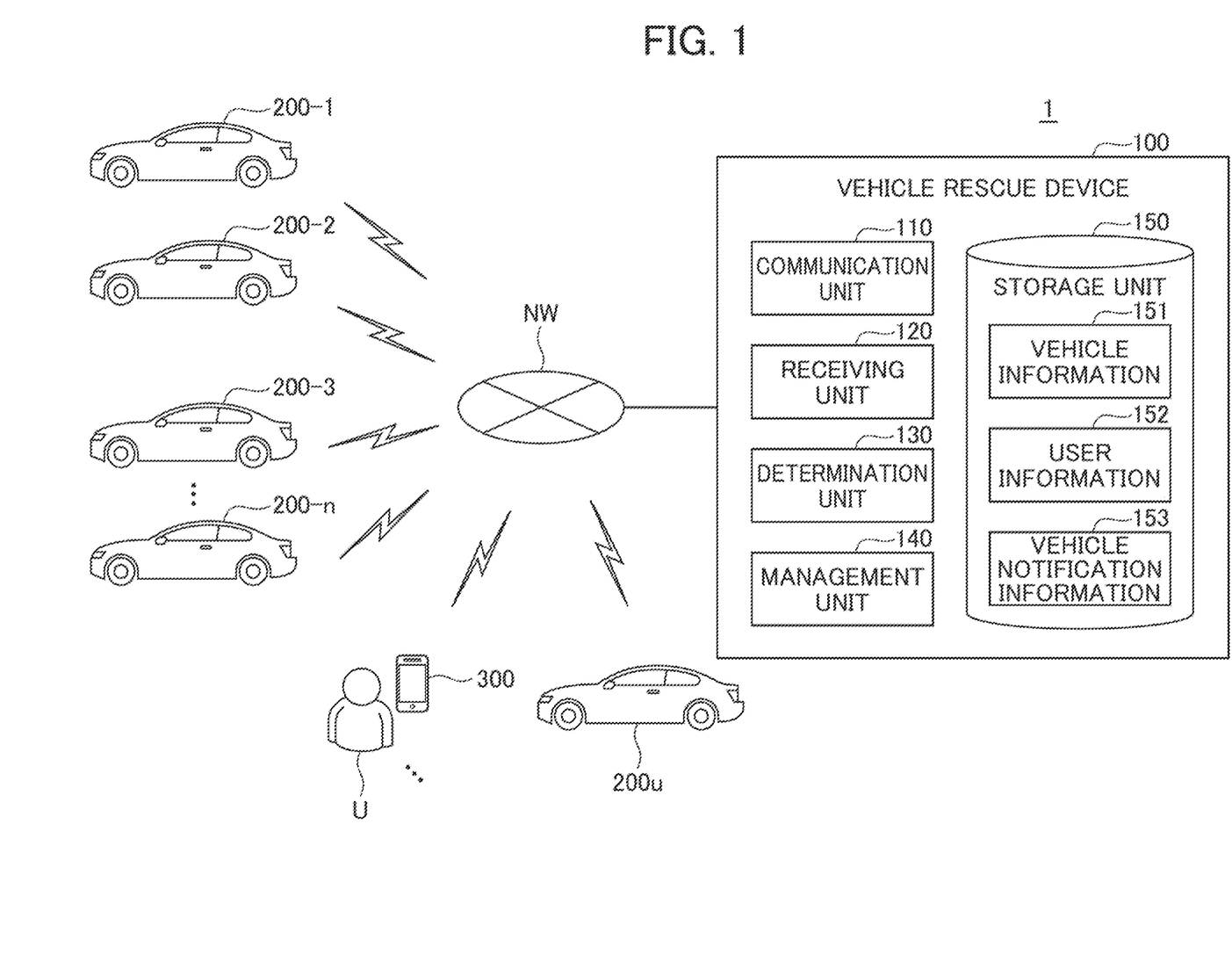
FIG. 1 is a block diagram of an electric power supply management system 1 including a vehicle rescue device 100 according to an embodiment of the present invention.

FIG. 1 is a block diagram of an electric power supply management system 1 including a vehicle rescue device 100 according to the present embodiment. The electric power supply management system 1 includes the vehicle rescue device 100, electric vehicles 200-1 to 200-n (n>2), one or more terminal devices 300 used by one or more users U, and one or more electric vehicles 200u used by the users U. Here, the one or more electric vehicles 200u refer to electric vehicles which are included in the electric vehicles 200-1 to 200-n and are used by the one or more users U. In the present embodiment, an example is described in which an electric power supply request notification is made from an electric vehicle 200u used by a user U, in response to which electric power is supplied from an electric vehicle 200 used by another user.

In the electric power supply management system 1, the vehicle rescue device 100, the electric vehicles 200-1 to 200-n, the one or more terminal devices 300 and the one or more electric vehicles 200u are communicably connected to one another via a network NW. The network NW includes the Internet, a wide area network (WAN), a local area network (LAN), a public communication line, a provider device, a dedicated communication line, a wireless base station, etc.

(Electric Vehicle 200)

Next, the electric vehicles 200-1 to 200-n will be described. In the following description, a given electric vehicle of the electric vehicles 200-1 to 200-n is referred to as an "electric vehicle 200". The electric vehicle 200 included in the electric power supply management system 1 is, for example, a four-wheeled movable body. The electric vehicle 200 is equipped with a battery (rechargeable battery), and is a battery electric vehicle that travels by driving an electric motor with electric power stored in the battery, or a hybrid electric vehicle that may be driven by an electric motor.

Figure 2:
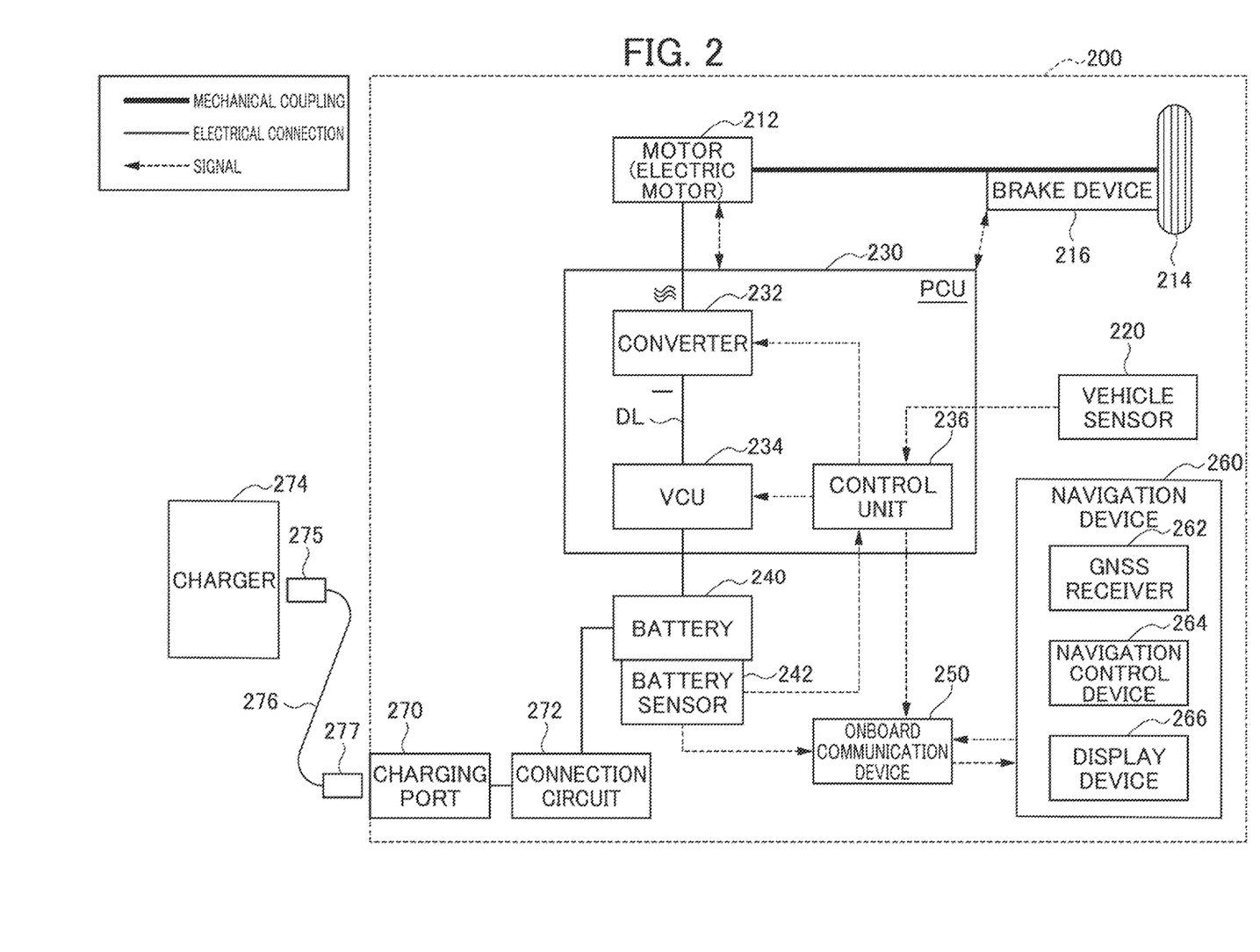
FIG. 2 shows a configuration of an electric vehicle 200 according to an embodiment of the present invention.

FIG. 2 shows a configuration of the electric vehicle 200 according to the present embodiment. FIG. 2 shows a configuration of an electric vehicle 200 which is not a self-driving vehicle. It should be noted that part or all of the electric vehicles 200-1 to 200-n may be self-driving vehicles. As shown in FIG. 2, the electric vehicle 200 includes a motor 212, a drive wheel 214, a brake device 216, a vehicle sensor 220, and a power control unit (PCU) 230. Alternatively, the electric vehicle 200 includes a battery 240, a battery sensor 242, an onboard communication device 250, a navigation device 260, a charging port 270, and a connection circuit 272.

The motor 212 is, for example, a three-phase AC electric motor. The rotor of the motor 212 is coupled to the drive wheel 214. The motor 212 outputs a driving force generated by supplied electric power to the drive wheel 214. In addition, when the electric vehicle 200 decelerates, the motor 212 uses the kinetic energy of the electric vehicle 200 to generate electricity.

The brake device 216 includes, for example, a brake caliper, a cylinder that transmits hydraulic pressure to the brake caliper, and an electric motor that generates hydraulic pressure in the cylinder. The brake device 216 may have a mechanism in which hydraulic pressure generated by an operation of a brake pedal is transmitted to the cylinder via a master cylinder. It should be noted that the brake device 216 is not limited to the configuration described above, but may also be an electronically controlled hydraulic brake device that transmits hydraulic pressure of the master cylinder to the cylinder.

The vehicle sensor 220 includes an accelerator opening sensor, a vehicle speed sensor, and a brake depression amount sensor. The accelerator opening sensor is an example of an operation unit that receives an acceleration instruction from the driver of the vehicle. The accelerator opening sensor is attached to the accelerator pedal, detects an operation amount of the accelerator pedal, and outputs the detected operation amount of the accelerator pedal as an accelerator opening to a control unit 236. The vehicle speed sensor includes, for example, a wheel speed sensor and a speed calculator attached to each vehicle wheel, combines wheel speeds detected by the wheel speed sensors to calculate the speed of the electric vehicle (vehicle speed), and outputs the vehicle speed to the control unit 236. The brake depression amount sensor is attached to the brake pedal, detects an operation amount of the brake pedal, and outputs the detected operation amount of the brake pedal as a brake depression amount to the control unit 236.

The PCU 230 includes a converter 232, a voltage control unit (VCU) 234, and the control unit 236. In FIG. 2, these elements are shown combined into the single configuration of the PCU 230 merely by way of example. Part or all of these elements may be arranged dispersed in the interior of the electric vehicle 200.

The converter 232 is, for example, an AC-DC converter. The DC terminal of the converter 232 is connected to a DC link DL. The DC link DL is connected to the battery 240 via the VCU 234. The converter 232 converts an alternating current generated by the motor 212 into a direct current and outputs the direct current to the DC link DL.

The VCU 234 is, for example, a DC-DC converter. The VCU 234 steps up the voltage of the electric power supplied from the battery 240 and outputs the electric power to the DC link DL. The control unit 236 includes, for example, a motor control unit, a brake control unit, and a battery/VCU control unit, etc. The motor control unit, the brake control unit, and the battery/VCU control unit may be replaced with respective separate control devices, for example, a motor ECU, a brake ECU, a battery ECU, etc.

The motor control unit controls the motor 212 based on the output from the vehicle sensor 220. The brake control unit controls the brake device 216 based on the output from the vehicle sensor 220. The battery/VCU control unit calculates the SOC (state of charge) of the battery 240 based on the battery sensor 242 attached to the battery 240, and outputs the calculated result of the SOC to the VCU 234 and the onboard communication device 250. The SOC is an example of information indicating the charge state of the battery 240. The VCU 234 steps up the voltage of the DC link DL according to an instruction from the battery/VCU control unit.

The battery 240 is, for example, a rechargeable battery such as a lithium-ion battery or the like. The battery 240 accumulates electric power introduced from a charger 274 outside of the electric vehicle 200, and discharges electric power so that the electric vehicle 200 can travel. The same kind of batteries 240 are assigned the same identification numbers. Batteries that have the same identification numbers share the same standards such as voltage, etc., and can therefore supply electric power to each other. The identification number assigned to the battery 240 (hereinafter referred to as "battery identification information") is stored, for example, as internal information in the onboard communication device 250.

The navigation device 260 includes, for example, a GNSS receiver 262, a navigation control device 264, and a display device 266. The GNSS receiver 262 measures its own position (the position of the electric vehicle 200) based on a signal from a GNSS satellite (e.g., a GPS satellite). The navigation control device 264 includes, for example, a CPU and any kind of storage device, and controls the entirety of the navigation device 260. The storage device stores map information (navigation map). The navigation map is a map that expresses roads as nodes and links.

The navigation control device 264 determines a route from the position of the electric vehicle 200 measured by the GNSS receiver 262 to a destination, with reference to the navigation map. Here, the destination may be designated using, for example, position information of the electric vehicle 200 included in an electric power supply request notification (described later). In addition, the navigation control device 264 may transmit the position of the electric vehicle 200 and the destination to a navigation server (not shown) using the onboard communication device 250, and acquire a route returned by the navigation server. Further, the route may include information regarding a rendezvous point with the electric vehicle 200u that has requested an electric power supply and estimated time of arrival. The navigation control device 264 outputs information regarding the route determined by either of the above methods to the display device 266.

The display device 266 displays information as controlled by the navigation control device 264. The display device 266 displays a navigation screen according to the information output from the navigation control device 264. The display device 266 displays, for example, a route to a rendezvous point with an electric vehicle 200u that has requested an electric power supply or an electric vehicle 200 of which to request an electric power supply, operations until stopping, etc. In addition, the GNSS receiver 262 outputs position information, which is the measured result of the position of the electric vehicle 200, to the onboard communication device 250.

The battery sensor 242 includes sensors such as, for example, a current sensor, a voltage sensor, a temperature sensor, etc. The battery sensor 242 detects, for example, a current value, a voltage value, and a temperature of the battery 240. The battery sensor 242 outputs information indicating the detected current value, voltage value, and temperature to the control unit 236 and the onboard communication device 250. The battery sensor 242 may include a plurality of each of the current sensor, the voltage sensor, the temperature sensor, etc. If the battery sensor 242 includes a plurality of sensors, the information indicating the current value, the voltage value, and the temperature to be output to the control unit 236 may include battery sensor identifiers. The battery sensor identifiers are identifiers that allow for identification of the plurality of sensors of the electric vehicle 200. The battery sensor identifiers may, for example, be represented by English letters determined in advance.

The onboard communication device 250 includes a wireless module for connecting to the Internet, a WAN, a LAN, a public communication line, a provider device, a dedicated communication line, a wireless base station, etc. The onboard communication device 250 acquires the information indicating the current value, the voltage value, and the temperature output by the battery sensor 242. In addition, the onboard communication device 250 acquires the calculated results of the SOC output by the control unit 236. The onboard communication device 250 acquires the position information of the electric vehicle 200 output by the GNSS receiver 262. The onboard communication device 250 acquires battery identification information stored as internal information.

When a user has performed an operation with respect to the terminal device 300 to request an electric power supply, the onboard communication device 250 creates an electric power supply request notification addressed to the vehicle rescue device 100, the electric power supply request notification including vehicle notification information including vehicle identification information, information indicating the charge state of the battery 240, position information of the electric vehicle 200 and battery identification information, and information indicating that an electric power supply has been requested. Further, when a user has performed an operation with respect to the terminal device 300 to accept a request to supply electric power to an electric vehicle 200u that has requested an electric power supply, the onboard communication device 250 creates a rescue acceptance notification addressed to the vehicle rescue device 100, the rescue acceptance notification including vehicle identification information, information indicating the charge state of the battery 240, and information including position information of the electric vehicle 200, battery identification information, and information indicating that the request for an electric power supply has been accepted. In addition, the rescue acceptance notification may include information indicating the current value, the voltage value, and the temperature detected by the battery sensor 242. The onboard communication device 250 transmits the created electric power supply request or rescue acceptance notification to the vehicle rescue device 100 via the network NW shown in FIG. 1.

The charging port 270 is provided oriented toward the vehicle exterior of the electric vehicle 200. The charging port 270 is connected to the charger 274 via a charging cable 276. The charging cable 276 includes a first plug 275 and a second plug 277. The first plug 275 is connected to the charger 274, and the second plug 277 is connected to the charging port 270. Electricity from the charger 274 is supplied to the charging port 270 via the charging cable 276. The charger 274 is an example of a charging facility. The charging cable 276 further includes a signal cable added to the electric power cable. The signal cable mediates communication between the electric vehicle 200 and the charger 274. Therefore, each of the first plug 275 and the second plug 277 is provided with an electric power connector and a signal connector.

The connection circuit 272 is provided between the charging port 270 and the battery 240. The connection circuit 272 transmits a current introduced from the charger 274 via the charging port 270, for example, a direct current. The connection circuit 272 transmits the direct current to the battery 240.

(Vehicle Rescue Device 100)

The vehicle rescue device 100 is a device that provides an electric power supply service described below to the electric vehicles 200-1 to 200-n. The functions of the vehicle rescue device 100 are realized by, for example, a personal computer, a server, an industrial computer, etc. As shown in FIG. 1, the vehicle rescue device 100 includes a communication unit 110, a receiving unit. 120, a determination unit 130, a management unit 140, and a storage unit 150.

The communication unit 110 is realized by a communication module. Specifically, the communication unit 110 is composed of a device performing wired communication. The communication unit 110 may also be composed of a wireless device compatible with wireless communication technologies such as LTE®, wireless LAN, etc. Via the network NW, the communication unit 110 performs communication between the terminal device 300 of the user U and the onboard communication device 250 included in the electric vehicle 200.

When the receiving unit 120 has acquired an electric power supply request notification output by the communication unit 110, the receiving unit 120 outputs the acquired electric power supply request notification to the determination unit 130. The receiving unit 120 acquires the vehicle identification information, the information indicating the charge state, the position information of the electric vehicle 200 and the battery identification information included in the vehicle notification information of the acquired electric power supply request notification, and stores these pieces of information in association with each other in the storage unit 150 as vehicle notification information 153. The receiving unit 120 executes the same process when it has acquired a rescue acceptance notification from the communication unit 110. Further, when the receiving unit 120 has acquired a rescue request notification output by the management unit 140, the receiving unit. 120 outputs the acquired rescue request notification to the communication unit 110.

Based on the electric power supply request received by the communication unit 110 and the vehicle notification information 153 stored in the storage unit 150, the determination unit 130 determines whether or not it is possible to dispatch the electric vehicle 200 of a user who sent the rescue acceptance notification (hereinafter also referred to as "electric vehicle that has accepted the rescue request") to the electric vehicle 200u of the user U who sent the electric power supply request notification (hereinafter also referred to as "electric vehicle that has requested an electric power supply"). The detailed functions of the determination unit 130 will be described later.

If the determination unit 130 has determined that it is possible to dispatch the electric vehicle 200 that has accepted the rescue request to the electric vehicle 200u that has requested an electric power supply, the management unit 140 causes the electric vehicle 200 that has accepted the rescue request to direct to a location where it is possible to perform an electric power supply to the electric vehicle 200u that has requested an electric power supply. The detailed functions of the management unit 140 will be described later.

The storage unit 150 is realized by a hard disk drive (HDD), a flash memory, a random-access memory (RAM), a read only memory (ROM), etc. The storage unit 150 stores, for example, vehicle information 151 and user information 152 described later, vehicle notification information 153, as well as map information (navigation map). It should be noted that part or all of this information may be stored in a storage device connected to the network NW.

Figures 3, 4:
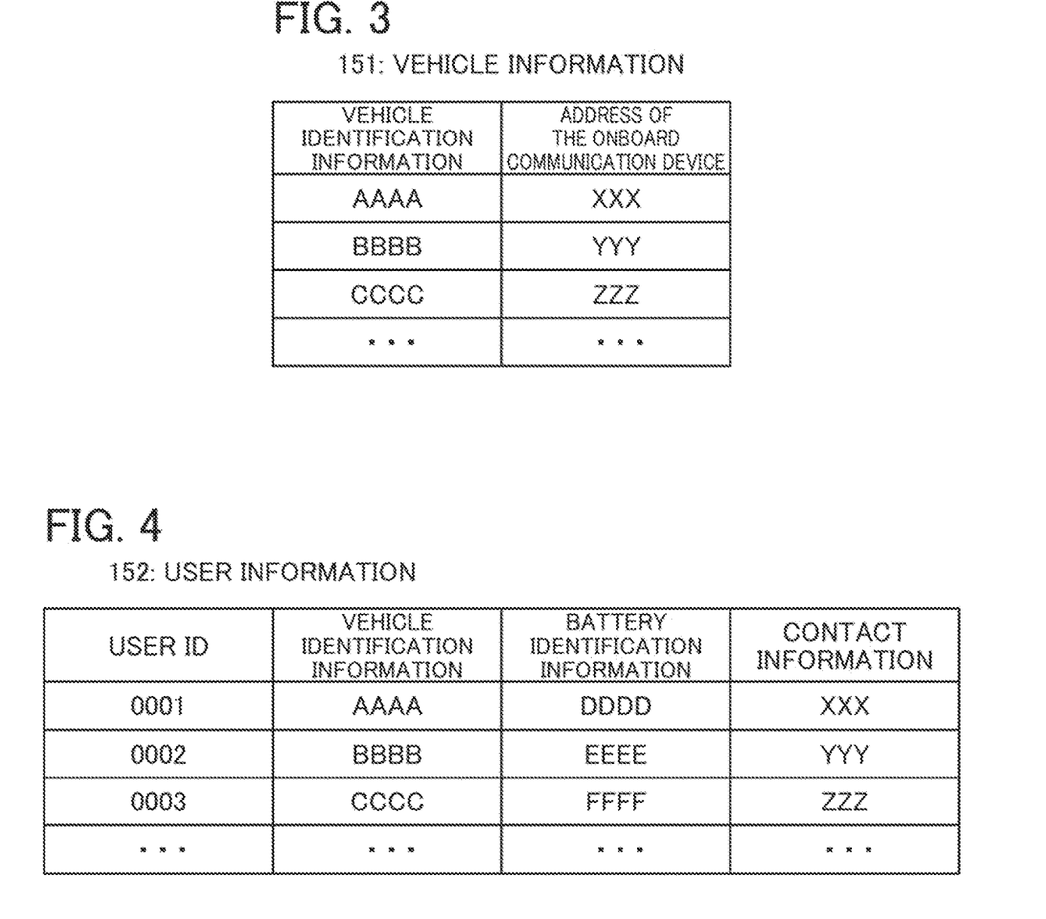
FIG. 3 shows an example of vehicle information 151.
FIG. 4 shows an example of user information 152.

Here, a specific example of vehicle information 151, user information 152, and vehicle notification information 153 stored in the storage unit 150 will be described. FIG. 3 shows an example of vehicle information 151. The vehicle information 151 is information in a table format, in which vehicle identification information of electric vehicles 200 and the addresses of the onboard communication devices installed in the electric vehicles 200 are associated with each other. An example of an address of an onboard communication device is an IP address. This information is registered when an electric vehicle 200 is introduced into the electric power supply management system 1.

FIG. 4 shows an example of user information 152. The user information 152 is information in a table format, in which user IDs, vehicle identification information of the electric vehicles 200 used by the users corresponding to the user IDs, battery identification information of the batteries 240 installed in the electric vehicles 200, and contact information of the users corresponding to the user IDs are associated with each other. An example of contact information of a user is an email address. This information is registered when a user begins using an electric vehicle 200.

Figure 5:
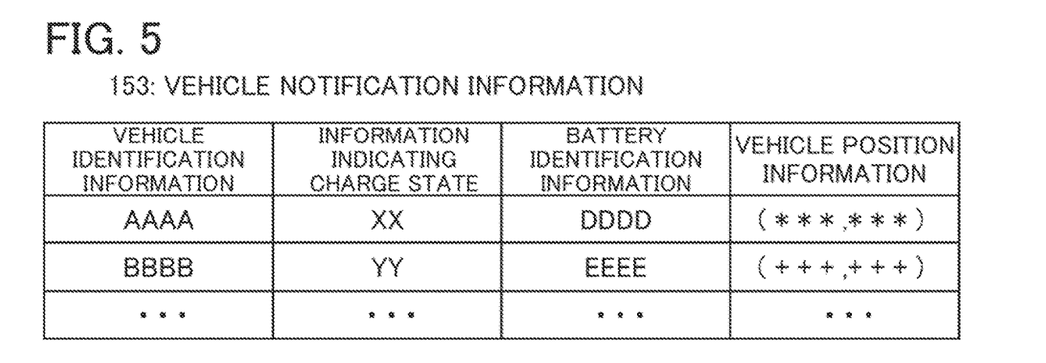
FIG. 5 shows an example of vehicle notification information 153.

FIG. 5 shows an example of vehicle notification information 153. The vehicle notification information 153 is information in a table format, in which vehicle identification of electric vehicles 200, information indicating charge states of the electric vehicles 200, battery identification information, and vehicle position information of the electric vehicles 200 are associated with each other. The vehicle position information of an electric vehicle 200 is, for example, represented by latitude and longitude of map information (navigation map). The information indicating the charge state of an electric vehicle 200 is, for example, represented by the SOC (state of charge) of the battery 240 installed in the electric vehicle 200.

The aforementioned receiving unit 120, determination unit 130, and management unit 140 are realized by a hardware processor such as, for example, a central processing unit (CPU) executing a program (software) stored in the storage unit 150. Further, part or all of these functions may be realized by hardware (including circuitry) such as large-scale integration (LSI), an application specific integrated circuit (ASIC), a field-programmable gate array (FPGA), a graphics processing unit (GPU), etc., or by cooperation of software and hardware. The program may be stored in advance in a storage device (a storage device including a non-transitory storage medium) such as a hard disk drive (HDD) or a flash memory etc., or it may be stored on a removable storage medium (a non-transitory storage medium) such as a DVD or CD-ROM, and may be installed by inserting the storage medium into a drive device.

(Terminal Device 300)

The terminal device 300 is, for example, a smart phone, tablet device, or personal computer, etc. owned by the user. An application program, browser, or the like for using the electric power supply management system 1 is started on the terminal device 300 to support various functions and operations. An example of the terminal device 300 is a smart phone, which is presumed to run an application program (electric power supply service application).

(Operation of the Electric Power Supply Management System 1)

Figure 6:
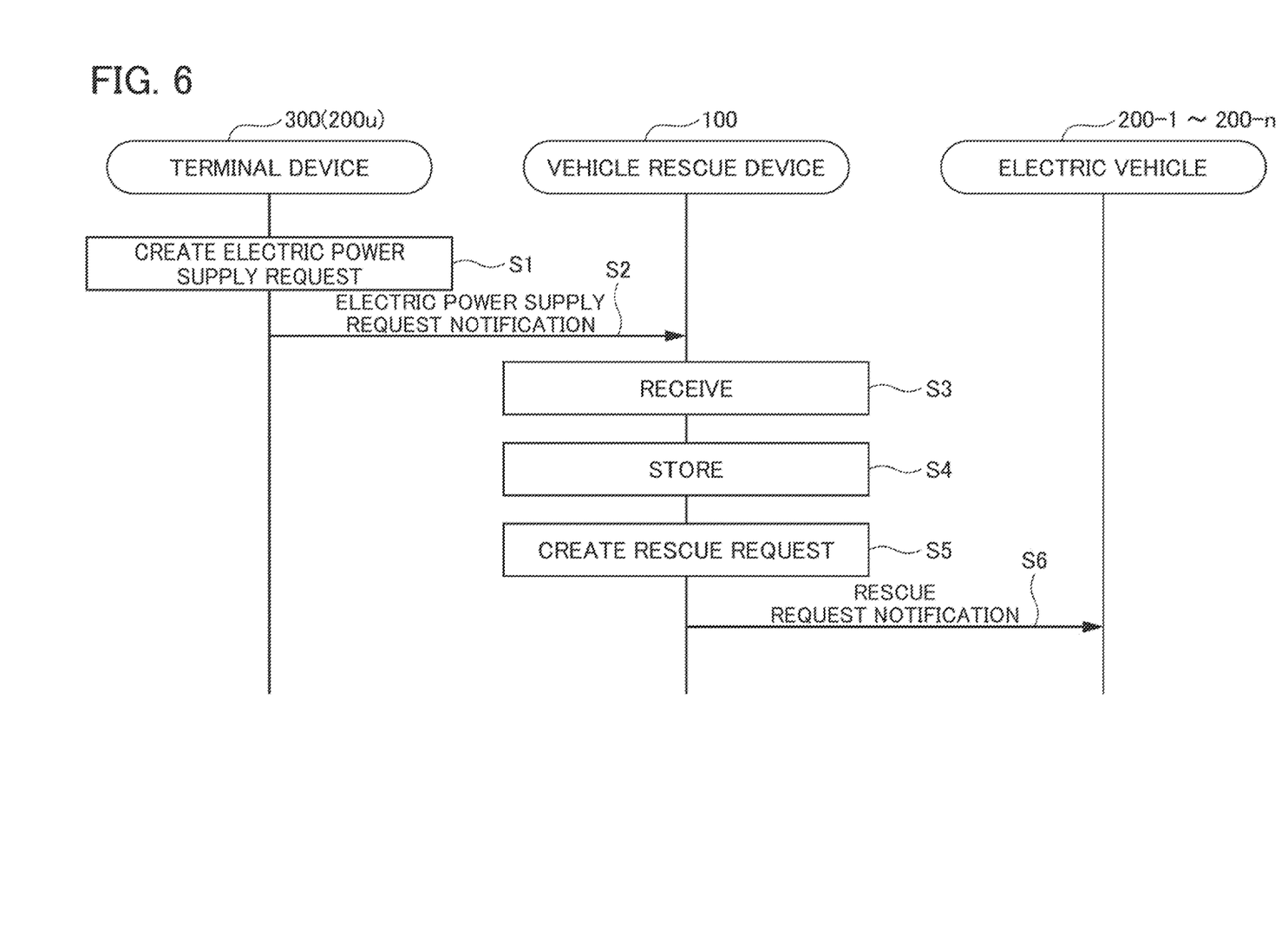
FIG. 6 is a sequence chart showing a procedure of an electric power supply service executed by the electric power supply management system 1 according to an embodiment of the present invention.
Figure 7:
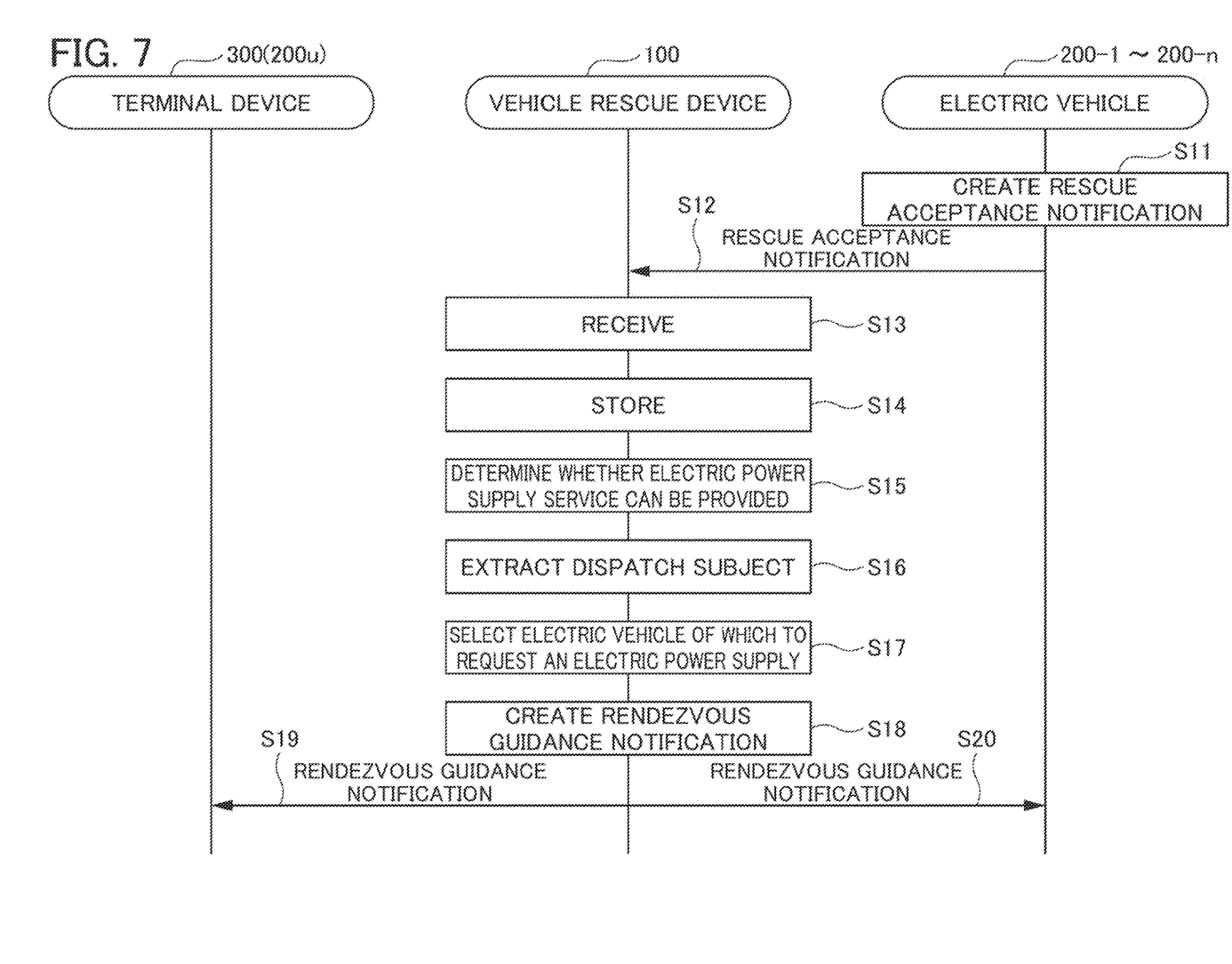
FIG. 7 is a sequence chart showing a procedure of an electric power supply service executed by the electric power supply management system 1 according to an embodiment of the present invention.

FIG. 6 and FIG. 7 are sequence charts showing a procedure of an electric power supply service executed by the electric power supply management system 1 according to the present embodiment. Described first, with reference to the sequence chart shown in FIG. 6, is the procedure in the electric power supply management system 1 from when the vehicle rescue device 100 has received an electric power supply request from a user U, until when the vehicle rescue device 100 transmits a rescue request notification to another electric vehicle 200.

The user U who desires an electric power supply performs an operation via the terminal device 300 to request an electric power supply from another electric vehicle 200. When an operation to request an electric power supply has been performed by the user U, the terminal device 300 creates an electric power supply request notification addressed to the vehicle rescue device 100, the electric power supply request notification including vehicle notification information of the electric vehicle 200u and information requesting an electric power supply (Step S1). The terminal device 300 transmits the created electric power supply request notification to the vehicle rescue device 100 (Step 32).

At the vehicle rescue device 100, the communication unit 110 receives the electric power supply request notification transmitted by the terminal device 300 (Step S3). At the vehicle rescue device 100, the communication unit 110 outputs the received electric power supply request notification to the receiving unit 120. The receiving unit 120 acquires the electric power supply request notification output by the communication unit 110, and acquires the vehicle identification information, information indicating a charge state, the position information of the electric vehicle 200, and the battery identification information included in the vehicle notification information of the acquired electric power supply request notification. The receiving unit 120 stores the acquired vehicle identification information, the information indicating a charge state, the position information of the electric vehicle 200, and the battery identification information in association with each other as vehicle notification information 153 in the storage unit 150 (Step S4). The vehicle notification information 153 is distinguished by the vehicle identification information which is assigned to each electric vehicle 200.

When the communication unit 110 has received an electric power supply request notification from the terminal device 300, the management unit 140 creates a rescue request notification addressed to the electric vehicles 200-1 to 200-n, the rescue request notification including vehicle notification information of the electric vehicle 200u and information requesting an electric power supply, and outputs the rescue request notification to the receiving unit 120 (Step S5). The rescue request notification is a notification requesting an electric power supply to the electric vehicle 200u of the user U.

The receiving unit 120 acquires the rescue request notification output by the management unit 140, and outputs the acquired rescue request notification to the communication unit 110. The communication unit 110 transmits the rescue request notification output from the receiving unit 120 to the electric vehicles 200-1 to 200-n (Step S6).

Described next, with reference to the sequence chart shown in FIG. 7, is the procedure in the electric power supply management system 1 after the vehicle rescue device 100 has transmitted the rescue request notification. Of the electric vehicles 200-1 to 200-n, a user who has accepted the request to supply electric power performs an operation via the terminal device 300 to accept the request to supply electric power to the electric vehicle 200u that has requested an electric power supply. When an operation to accept the request to supply electric power has been performed by the user, the terminal device 300 creates a rescue acceptance notification addressed to the vehicle rescue device 100, the rescue acceptance notification including vehicle notification information regarding the vehicle and information accepting the electric power supply request (Step S11).

The terminal device 300 transmits the created rescue acceptance notification to the vehicle rescue device 100 (Step 312). If there is one or more electric vehicles 200 that have accepted the electric power supply request, a respective rescue acceptance notification is transmitted from each electric vehicle 200 that has accepted the electric power supply request.

At the vehicle rescue device 100, the communication unit 110 receives the rescue acceptance notification transmitted from the electric vehicle 200 of the user who requests an electric power supply (Step S13). At the vehicle rescue device 100, the communication unit 110 outputs the received rescue acceptance notification to the receiving unit 120. The receiving unit 120 acquires the rescue acceptance notification output by the communication unit 110, and acquires the vehicle identification information, the information indicating a charge state, the position information of the electric vehicle 200, and the battery identification information included in the vehicle notification information of the acquired rescue acceptance notification. The receiving unit 120 stores the acquired vehicle identification information, the information indicating a charge state, the position information of the electric vehicle 200, and the battery identification information in association with each other as vehicle notification information 153 in the storage unit 150 (Step S14)

At the vehicle rescue device 100, the determination unit 130 determines, based on the vehicle notification information 153 (storage unit 150) of the one or more electric vehicles 200 that have accepted the rescue request, whether or not an electric power supply service can be provided. That is to say, the determination unit 130 determines whether or not an electric vehicle 200 that has accepted the rescue request can be dispatched to the electric vehicle 200u that has requested an electric power supply (Step S15).

Based on the vehicle position information acquired from the vehicle notification information 153 of the electric vehicle 200 that has accepted the rescue request, the determination unit 130 calculates a distance between the electric vehicle 200u that has requested an electric power supply and the electric vehicle 200 that has accepted the rescue request. If the calculated distance is equal to or less than a distance threshold, the determination unit 130 determines that one condition for designating the electric vehicle 200 that has accepted the rescue request as a dispatch subject has been satisfied. The distance threshold is determined by the charge state, etc. of the electric vehicle 200u that has requested an electric power supply.

Based on the information indicating a charge state acquired from the vehicle notification information 153 of the same electric vehicle 200 that has accepted the rescue request, the determination unit 130 determines that another condition for designating the electric vehicle 200 that has accepted the rescue request as a dispatch subject has been satisfied if the SOC (state of charge) is equal to or more than an SoC threshold. The SOC threshold is determined with consideration to deterioration of the battery 240 of the electric vehicle 200u, etc.

If the battery identification information acquired from the vehicle notification information 153 of the same electric vehicle 200 that has accepted the rescue request matches the battery information included in the vehicle notification information received from the electric vehicle 200u that has requested an electric power supply, the determination unit 130 determines that yet another condition for designating the electric vehicle 200 that has accepted the rescue request as a dispatch subject has been satisfied.

When all of the above three conditions have been satisfied for one or more electric vehicles 200 that have accepted the rescue request, the determination unit 130 extracts those electric vehicles 200 as dispatch subjects for the electric vehicle 200u that has requested an electric power supply. The determination unit 130 determines whether or not all of the above three conditions have been satisfied for all the electric vehicles 200 that have accepted the rescue request, and extracts one or more electric vehicles 200 that satisfy all three of the above conditions as dispatch subjects for the electric vehicle 200u that has requested an electric power supply (Step S16). The determination unit 130 outputs the vehicle identification information of the one or more electric vehicles 200 extracted as dispatch subjects to the management unit 140.

The management unit 140 acquires the vehicle identification information of the one or more electric vehicles 200 extracted by the determination unit 130. The management unit 140 selects one of the electric vehicles 200 associated with the one or more acquired sets of vehicle identification information as an electric vehicle 200 of which to request an electric power supply. If the management unit 140 has acquired the vehicle identification information of a plurality of electric vehicles 200, it selects, for example, the electric vehicle 200 which is closest to the electric vehicle 200u that has requested an electric power supply as the electric vehicle 200 of which to request an electric power supply.

The management unit 140 acquires the vehicle notification information of the electric vehicle 200u that has requested an electric power supply, the vehicle notification information of the electric vehicle 200 to which to request the electric power supply, and the map information, etc. stored in the storage unit 150, and, based on this information, identifies a location where the electric vehicle 200 of which to request the power supply and the electric vehicle 200u that has requested the power supply can rendezvous, in other words a location where the electric power supply can be performed (rendezvous point), and creates a rendezvous guidance notification including position information of this location (Step S18).

The management unit 140 outputs the created rendezvous guidance notification to the communication unit 110. Further, if it is not possible to provide an electric power supply service to the electric vehicle 200u that has requested an electric power supply, that is to say if an electric vehicle 200 of which to request the power supply cannot be selected, the management unit 140 creates a vehicle response including information indicating that the electric power supply service cannot be provided, and outputs the vehicle response to the communication unit 110.

The communication unit 110 transmits the rendezvous guidance notification output from the management unit 140 respectively to the electric vehicle 200u that has requested an electric power supply and to the electric vehicle 200 of which to request the electric power supply (Step S19, Step S20). Alternatively, if the vehicle response indicating that the electric power supply service cannot be provided has been output from the management unit 140, the communication unit 110 transmits this vehicle response to the electric vehicle 200u that has requested an electric power supply.

Then, the respective navigation devices 260 of the electric vehicle 200u that has requested an electric power supply and the electric vehicle 200 of which to request the electric power supply guide the drivers to the rendezvous point based on the position information, etc. included in the rendezvous guidance notification. This allows the drivers of the electric vehicle 200u that has requested an electric power supply and the electric vehicle 200 of which to request the electric power supply to stop their respective electric vehicles at a safe location and perform the electric power supply between the electric vehicles. This electric power supply may be done using the charging cable 276 (see FIG. 2), or by wireless electric power supply.

According to the vehicle rescue device 100 of the embodiment described above, when selecting the electric vehicle 200 of which to request an electric power supply out of all the electric vehicles 200 that have accepted the rescue request, whether or not the battery information of the electric vehicle 200u that has requested an electric power supply matches that of the electric vehicle 200 that has accepted the rescue request is included as one of the determination conditions. This makes it possible to match the voltages, etc. of the respective batteries of the electric vehicle 200u that has requested an electric power supply and the electric vehicle 200 of which to request the electric power supply, allowing for more reliable electric power supply between the electric vehicles.

In the vehicle rescue device 100 according to the present embodiment, when the communication unit 110 has received an electric power supply request notification from the terminal device 300, the management unit 140 causes the communication unit 110 to transmit the rescue request notification to the electric vehicles 200-1 to 200-n, and to receive the rescue acceptance notifications from one or more of the electric vehicles 200. In this way, the management unit 140 causes the communication unit 110 to transmit the rescue request notification when the electric power supply request notification has been received, and can therefore acquire the latest vehicle notification information of the electric vehicles that have accepted the rescue request.

Alternatively, in the present embodiment, the vehicle notification information of the electric vehicle 200 used by a user that has accepted the electric power supply request may be stored in advance in the storage unit 150 of the vehicle rescue device 100, so that when an electric power supply request notification has been received, the electric vehicle 200 of which to request the electric power supply may be selected based on the vehicle notification information stored in the storage unit 150. In this case, by periodically updating the vehicle notification of the electric vehicle 200 of the user who has accepted the electric power supply request, the electric vehicle 200 of which to request the electric power supply can be selected quicker when an electric power supply request notification has been received.

An embodiment of the present disclosure has been described above, but the present disclosure is not limited to the aforementioned embodiment, and various modifications and changes are possible, which are also included in the technical scope of the present disclosure. In addition, the effects described in the embodiment are merely a list of the most preferred effects exhibited by the present disclosure, and are not limited to the effects described in the embodiment.

EXPLANATION OF REFERENCE NUMERALS

1 Electric power supply management system
100 Vehicle rescue device
110 Communication unit
120 Receiving unit
130 Determination unit
140 Management unit
150 Storage unit
200-1 to 200-n, 200, 200u Electric vehicle
240 Battery
250 Onboard communication device
260 Navigation device
300 Terminal device
NW Network

What is claimed is:

1. A vehicle rescue device comprising
a communication unit that is communicable with an onboard communication device or a terminal device of a user of each of a plurality of electric vehicles;
a receiving unit configured to store, in a storage unit, vehicle notification information including respective vehicle identification information, position information, identification information of a rechargeable battery, and information indicating a charge state of one or more electric vehicles received by the communication unit;
a determination unit configured to determine, in a case in which an electric vehicle operated by a user accepts rescue request made by an electric vehicle operated by another user for supply of electric power to the electric vehicle operated by the another user, based on the vehicle notification information of the electric vehicle that has made the rescue request for the supply of electric power and the vehicle notification information of the electric vehicle that has accepted the rescue request at a time of accepting the rescue request, whether or not the electric vehicle that has accepted the rescue request can be dispatched to the electric vehicle that has requested the electric power supply; and
a management unit configured to direct the electric vehicle that has accepted the rescue request to a location where the supply of electric power to the electric vehicle that has made the request for the supply of electric power can be performed, if the determination unit has determined that the electric vehicle that has accepted the rescue request can be dispatched to the electric vehicle that has made the rescue request for the supply of electric power.

2. The vehicle rescue device according to claim 1, wherein when the communication unit has received an electric power supply request notification from the terminal device of a user, the management unit causes the communication unit to transmit a rescue request notification to another electric vehicle, and to receive a rescue acceptance notification from one or more electric vehicles.

3. The vehicle rescue device according to claim 1, wherein the information indicating the charge state of the electric vehicle includes a state of charge of a rechargeable battery installed in the electric vehicle.

4. A vehicle rescue method performed by a vehicle rescue device including a communication unit that is communicable with an onboard communication device or a terminal device of a user, the method comprising:
storing, in a storage unit, vehicle notification information including respective vehicle identification information, position information, identification information of a rechargeable battery, and information indicating a charge state of one or more electric vehicles received by the communication unit;
determining, in a case in which an electric vehicle operated by a user accepts rescue request made by an electric vehicle operated by another user for supply of electric power to the electric vehicle operated by the another user, based on the vehicle notification information of the electric vehicle that has made the rescue request for the supply of electric power and the vehicle notification information of the electric vehicle that has accepted the rescue request at a time of accepting the rescue request, whether or not the electric vehicle that has accepted the rescue request can be dispatched to the electric vehicle that has requested the electric power supply; and
directing the electric vehicle that has accepted the rescue request to a location where the supply of electric power to the electric vehicle that has made the request for the supply of electric power can be performed, if it has been determined that the electric vehicle that has accepted the rescue request can be dispatched to the electric vehicle that has made the rescue request for the supply of electric power.

5. A non-transitory computer readable medium storing a program that causes a vehicle rescue device including a communication unit that is communicable with an onboard communication device or a terminal device of a user to perform a method, the method comprising:
storing, in a storage unit, vehicle notification information including respective vehicle identification information, position information, identification information of a rechargeable battery, and information indicating a charge state of one or more electric vehicles received by the communication unit;
determining, in a case in which an electric vehicle operated by a user accepts rescue request made by an electric vehicle operated by another user for supply of electric power to the electric vehicle operated by the another user, based on the vehicle notification information of the electric vehicle that has made the rescue request for the supply of electric power and the vehicle notification information of the electric vehicle that has accepted the rescue request at a time of accepting the rescue request, whether or not the electric vehicle that has accepted the rescue request can be dispatched to the electric vehicle that has requested the electric power supply; and directing the electric vehicle that has accepted the rescue request to a location where the supply of electric power to the electric vehicle that has made the request for the supply of electric power can be performed, if it has been determined that the electric vehicle that has accepted the rescue request can be dispatched to the electric vehicle that has made the rescue request for the supply of electric power.

\* \* \* \* \*